(12) United States Patent
Hara et al.

(10) Patent No.: US 7,080,848 B2
(45) Date of Patent: Jul. 25, 2006

(54) BICYCLE HEAD CAP UNIT

(75) Inventors: Nobukatsu Hara, Osaka (JP); Takuji Tatsumi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/663,990

(22) Filed: Sep. 17, 2003

(65) Prior Publication Data

US 2005/0057017 A1  Mar. 17, 2005

(51) Int. Cl.
*B62K 21/18* (2006.01)
(52) U.S. Cl. .................................. 280/279; 280/288.4
(58) Field of Classification Search ............... 280/276, 280/279, 288.4, 291, 282, 280; 74/564, 551.8, 74/493, 495; 297/423.23; 340/432
See application file for complete search history.

(56) References Cited

U.S. PATENT DOCUMENTS

| | | | |
|---|---|---|---|
| 3,785,676 A | 1/1974 | Klein, Jr. | |
| 4,274,301 A | 6/1981 | Katayama | |
| 4,310,260 A | 1/1982 | Katayama | |
| 4,435,983 A | 3/1984 | Shimano | |
| 4,489,307 A | 12/1984 | Nagano | |
| 4,770,435 A * | 9/1988 | Cristie | 280/279 |
| 5,095,770 A | 3/1992 | Rader, III | |
| 5,330,220 A | 7/1994 | Nagano | |
| 5,681,119 A | 10/1997 | Marui | |
| 5,791,671 A * | 8/1998 | Tang et al. | 280/264 |
| 5,927,740 A | 7/1999 | Hopey | |
| 5,971,116 A | 10/1999 | Franklin | |
| 6,126,323 A | 10/2000 | Tange | |
| 6,149,174 A | 11/2000 | Bohn | |
| 6,303,248 B1 * | 10/2001 | Peterson | 429/177 |
| 6,431,575 B1 * | 8/2002 | Campagnolo | 280/279 |
| 6,612,599 B1 | 9/2003 | Miyoshi | |
| 6,616,165 B1 * | 9/2003 | Tsuji | 280/288.4 |
| 2003/0230228 A1 * | 12/2003 | Kinoshita | 116/28 R |
| 2004/0188976 A1 * | 9/2004 | Schmider | 280/279 |

FOREIGN PATENT DOCUMENTS

| | | |
|---|---|---|
| JP | 62-40868 U | 10/1987 |
| WO | WO 92/14643 A1 | 9/1992 |

* cited by examiner

*Primary Examiner*—Anne Marie Boehler
(74) *Attorney, Agent, or Firm*—Global IP Counselors, LLP

(57) ABSTRACT

A bicycle head cap unit is configured and arranged to mount an electrical device or part in a steerer tube of a bicycle fork. The bicycle head cap unit basically has a cap portion and a housing portion. The cap portion is dimension to close a top opening of a steerer tube of a bicycle fork. The housing portion is coupled to the cap portion. The housing portion is configured to form an electrical part receiving space that is located within the steerer tube when the cap portion closes the top opening of the steerer tube of the bicycle fork.

24 Claims, 9 Drawing Sheets

BICYCLE HEAD CAP UNIT

BACKGROUND OF THE INVENTION

1. Field of the Invention

This invention generally relates to a bicycle head cap unit that is coupled to a steerer tube of a front bicycle fork. More specifically, the present invention relates to a bicycle head cap unit configured with an electrical device.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle.

Recently, bicycles have been equipped with electrical components to make riding easier and more enjoyable for the rider. Some bicycles are equipped with computer controlled suspensions that are automatically adjusted according to the riding conditions by a cycle computer or control unit. An example of a computer controlled suspension is disclosed in U.S. Pat. No. 6,543,799, which is assigned to Shimano, Inc. Moreover, many new bicycles have automatic shifting units that are automatically adjusted according to the riding conditions by a cycle computer or control unit.

Accordingly, these bicycles with electrical components need to be equipped with control devices for controlling the various electrical components and one or more batteries for supplying electrical power to the various electrical components. Unfortunately, there is a limited amount of space on a bicycle frame to mount all of these electronic components. Moreover, these electronic components are preferably mounted in particular areas of the bicycle, which further limits the mounting areas for the electronic components. Also it is desirable to mount the electronic components in such a manner as to be attractive and easy to use. Another consideration in the mounting areas of the electronic components, it the need to provide a waterproof design so that the electronic components are not damages by the environment.

Moreover, in order to drive all of these electronic components, some bicycles have been equipped with a hub dynamo for generating and supplying electrical power to the various electrical components such as cycle computers, electronic suspensions, electronic shifting units, lamps, etc. Two examples of hub dynamos are disclosed in U.S. Pat. Nos. 6,409,197 and 6,559,564, which are assigned to Shimano, Inc.

In view of the above, it will be apparent to those skilled in the art from this disclosure that there exists a need for an improved bicycle head cap unit. This invention addresses this need in the art as well as other needs, which will become apparent to those skilled in the art from this disclosure.

SUMMARY OF THE INVENTION

One object of the present invention is to provide a bicycle head cap unit that can be used to mount an electrical device or part in a steerer tube of a bicycle fork.

Another object of the present invention is to provide a bicycle head cap unit that is relatively inexpensive to manufacture.

The foregoing objects can basically be attained by providing a bicycle head cap unit that basically comprises a cap portion and a housing portion. The cap portion is dimension to close a top opening of a steerer tube of a bicycle fork. The housing portion is coupled to the cap portion. The housing portion is configured to form an electrical part receiving space that is located within the steerer tube when the cap portion closes the top opening of the steerer tube of the bicycle fork.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
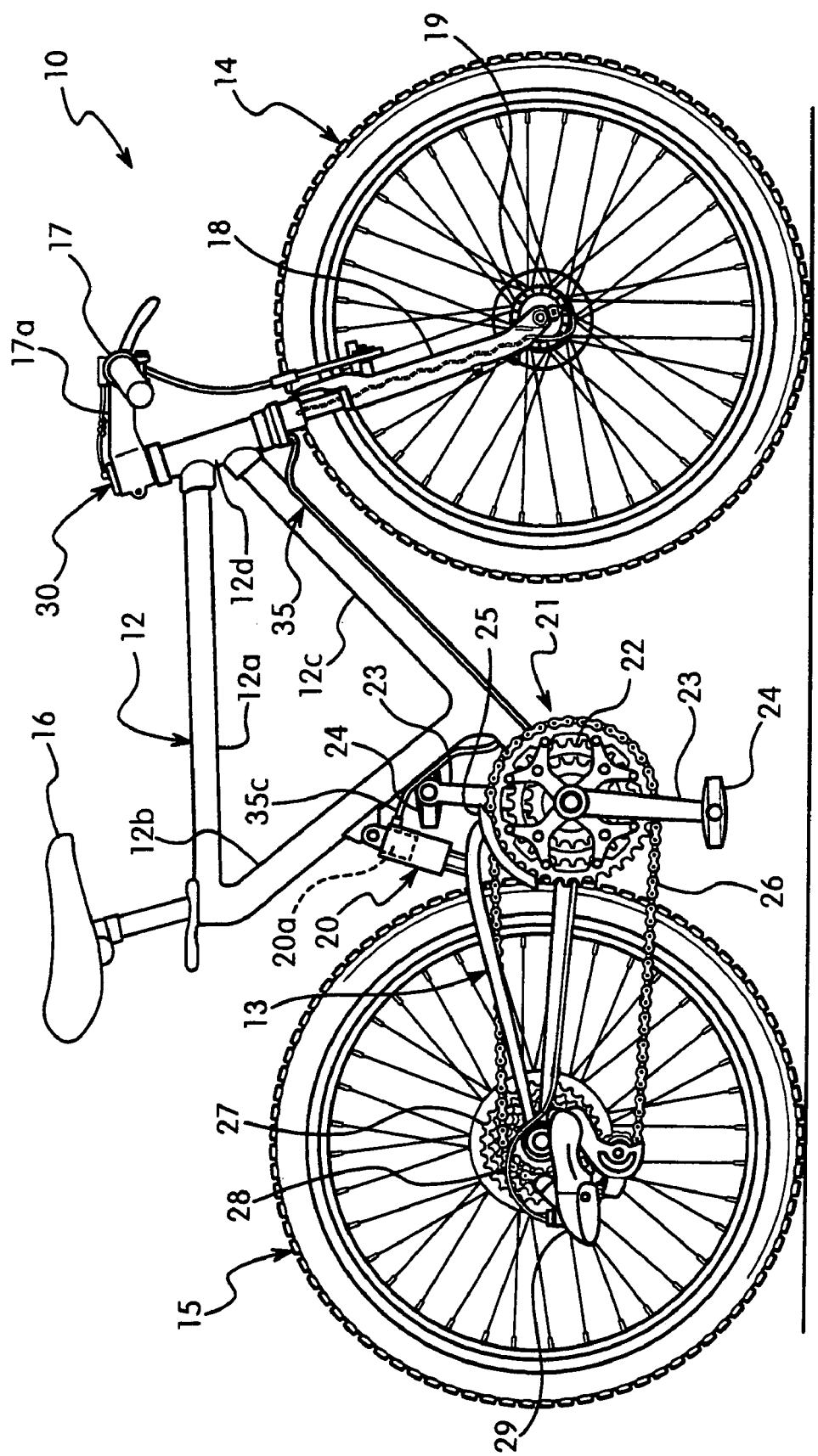
FIG. 1 is a side elevational view of a bicycle with a front bicycle suspension and a rear bicycle suspension that are electrically coupled to utilize a bicycle head cap unit in accordance with a first embodiment of the present invention.

Referring initially to FIG. 1, a bicycle 10 is illustrated that is equipped with various electronic components in such a manner as to carryout a first embodiment of the present invention as discussed below. Bicycles and their various components are well known in the art, and thus, bicycle 10 and its various components will not be discussed and/or illustrated in detail herein, except for the components that relate to the present invention. Also as used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

As seen in FIG. 1, the bicycle 10 basically includes a main frame 12, a rear chain stay 13, a front wheel 14 and a rear wheel 15. The main frame 12 is also equipped with a seat 16, a handlebar 17 and a front suspension fork 18 that rotatably supports the front wheel 14 via a front dynamo hub 19 of the front wheel 14. The main frame 12 basically includes a top tube 12a, a seat tube 12b, a down tube 12c and a head tube 12d.

Figure 2:
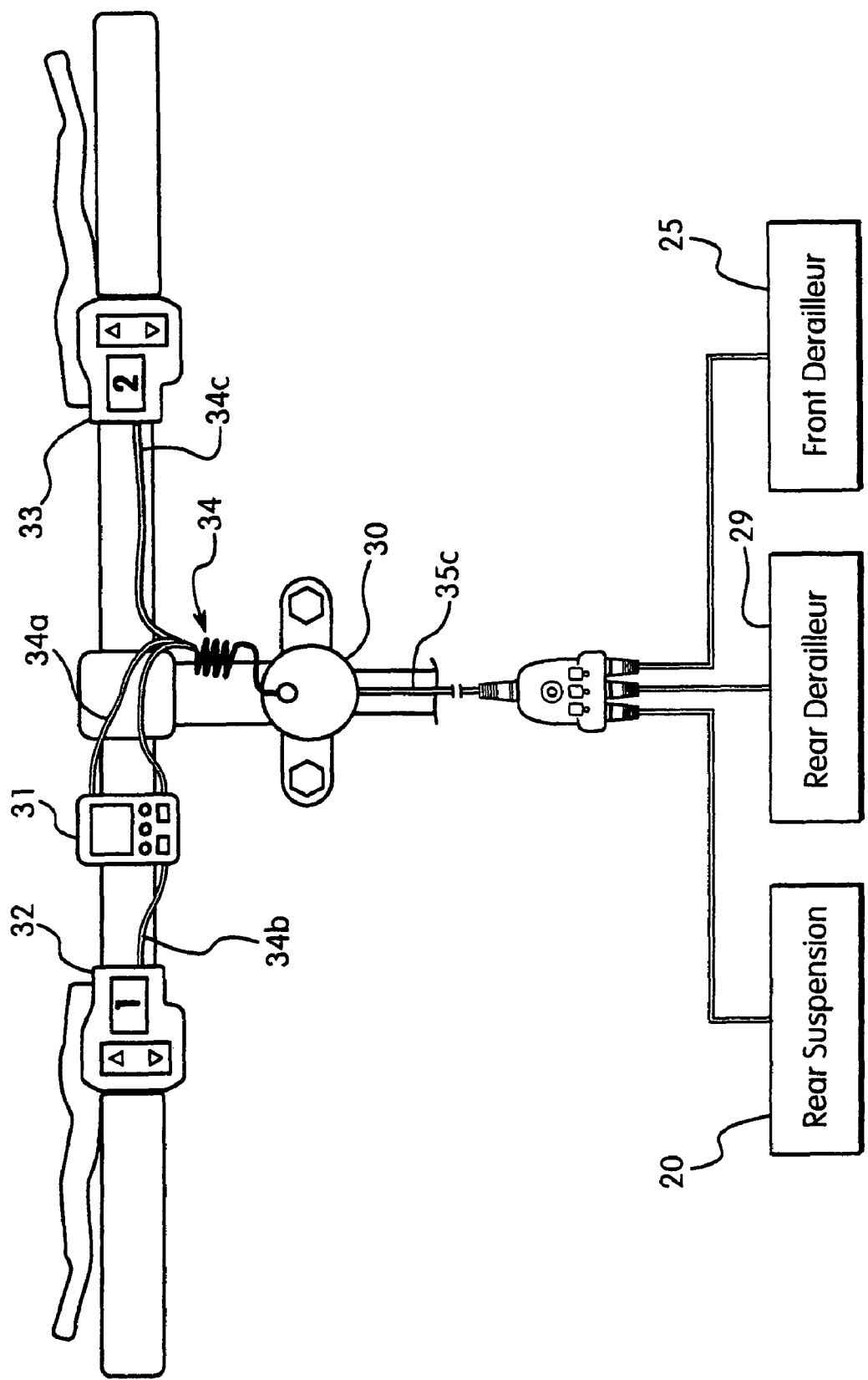
FIG. 2 is a partial top plan view of a front portion of the bicycle illustrated in FIG. 1, which illustrates the various components coupled to the bicycle head cap unit in accordance with the first embodiment of the present invention.

As seen in FIGS. 1 and 2, an upper end of the front suspension fork 18 is movably coupled to the head tube 12d of the main frame 12, while the lower end of the front suspension fork 18 is coupled to the front dynamo hub 19. Thus, the front wheel 14 is rotatably mounted to the front suspension fork 18 by the front dynamo hub 19 in conventional manner. The handlebar 17 is fixed to the front suspension fork 12 in a conventional manner for turning the front suspension fork 12 and the front wheel 14 relative to the main frame 12.

Figure 3:
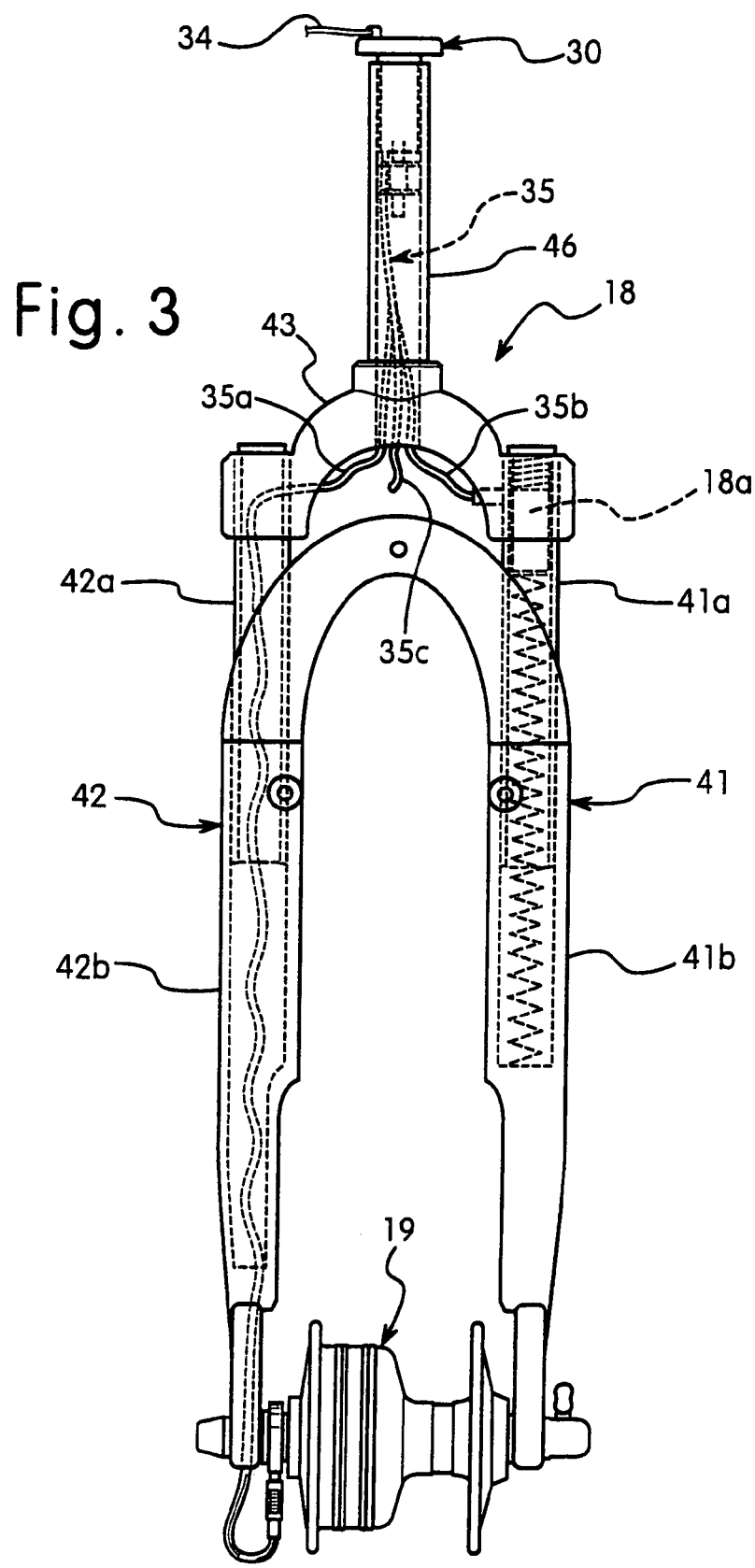
FIG. 3 is a front elevational view of the front suspension fork of the bicycle illustrated in FIG. 1 that is equipped with the bicycle head cap unit which is electrically coupled to the electric device of the front bicycle suspension and the front bicycle hub dynamo in accordance with the first embodiment of the present invention.

As seen in FIG. 3, the front suspension fork 18 is preferably an electronically controlled suspension that includes an electric device 18a that changes the dampening characteristics of the front suspension fork 18. Since the precise structure of the electric device 18a is not important to the present invention, the precise structure of the electric device 18a will not be discussed or illustrated in detail herein. In fact, the structure of the electric device 18a has been illustrated in a simplified manner in FIG. 3 for the sake of simplicity and for easy of illustration. An example of an electronically controlled front suspension is the front suspension of the Nexave C-910 components that are sold by Shimano Inc.

Referring back to FIG. 1, the rear chain stay 13 is pivotally coupled to the main frame 12 by a bottom bracket (not shown). A rear suspension unit 20 is operatively coupled between the main frame 12 and the rear chain stay 13 to absorb shocks transmitted to the rear wheel 15. The rear suspension unit 20 is an electronically controlled suspension that includes an electric device 20a that changes the dampening characteristics of the rear suspension unit 20. Since the precise structure of the electric device 20a is not important to the present invention, the precise structure of the electric device 20a will not be discussed or illustrated in detail herein. In fact, the structure of the electric device 20a has been illustrated in a simplified manner in FIG. 1 for the sake of simplicity and for easy of illustration. An example of an electronically controlled rear suspension is the rear suspension of the Nexave C-910 components that are sold by Shimano Inc.

A drive train 21 is also operatively coupled between the main frame 12 and the rear chain stay 13 in a conventional manner. The drive train 21 basically includes a plurality of front chain rings or sprockets 22 mounted on a bottom bracket (not shown), a pair of crank arms 23 with a pair of pedals 24, a front derailleur 25 mounted on the bottom bracket (not shown), a drive chain 26, a plurality of rear sprockets 27 coupled to a rear hub 28 of the rear wheel 15 in a conventional manner, and a rear derailleur 29 mounted to the rear chain stay 13. Since these parts of bicycle 10 are well known in the art, these parts will not be discussed or illustrated in detail herein, except as they are modified to be used in conjunction with the present invention. Moreover, various conventional bicycle parts such as brakes, etc., which are not illustrated and/or discussed herein, are also used in conjunction with the present invention as needed and/or desired.

Moreover, as seen in FIG. 2, the bicycle 10 is equipped with various electronic control components mounted in the handlebar 17. In particular, the bicycle 10 is equipped with a bicycle head cap unit 30, a cycle computer 31, a front shifting unit 32 and a rear shifting unit 33. The bicycle head cap unit 30 is electrically coupled to the cycle computer 31, the front shifting unit 32 and the rear shifting unit 33 by an electrical cord 34 that splits into several feed wires or cord portions 34a, 34b and 34c that each includes a plurality of electrical conductors. As seen in FIGS. 1 and 2, an electrical cord 35 is coupled to the bottom of the bicycle head cap unit 30 for electrically coupling to the front dynamo hub 19 the electric device 18a of the front suspension fork 18, the electric device 20a of the rear suspension unit 20, the front derailleur 25 and the rear derailleur 29 thereto. Preferably, the electrical cord 35 splits into several feed wires or cord portions that includes an electrical cord portion 35a electrically coupled to the front dynamo hub 19, an electrical cord portion 35b electrically coupled to the electric device 18a of the front suspension fork 18, and an electrical cord portion 35c electrically coupled to the electric device 18a of the front suspension fork 18, the front derailleur 25 and the rear derailleur 29 by an electrical cord 35. Accordingly, each of these cord portions 35a–35c includes a plurality of conductors. Examples of various electronic control components that can be used with the present invention are the Nexave C-910 components that are sold by Shimano Inc.

Since the precise structure of the electrical cords 34 and 35 as well as their various electrical connections are not important to the present invention, the precise structure of the electrical cords 34 and 35 as well as their various electrical connections will not be discussed or illustrated in detail herein. In fact, the structure of the electrical cords 34 and 35 as well as their various electrical connections have been illustrated in a simplified manner for the sake of simplicity and for easy of illustration. Moreover, the construction of the electrical cords 34 and 35 as well as their various electrical connections will depend upon the number and type of electrical components that are connected to the bicycle head cap unit 30.

The bicycle head cap unit 30 is coupled to the front suspension fork 18 in accordance with the first embodiment of the present invention. As explained below in more detail below, the bicycle head cap unit 30 is configured and arranged to supply electrical power and/or control signals to the various electronic components of the bicycle 10 and to acts as a control unit as needed and/or desired.

The cycle computer 31 includes a plurality of push buttons for operating the automatic shifting control and the automatic suspension control. In the illustrated embodiment, as seen in FIG. 2, the cycle computer 31 is electrically coupled to the bicycle head cap unit 30 by the electrical cord portion 34a of the electrical cord 34. The cycle computer 31 is preferably configured and arranged to output the rider input commands to the bicycle head cap unit 30, which has control programs stored for controlling the automatic suspension and the automatic shifting based on the rider input commands. Alternatively, the cycle computer 31 and the bicycle head cap unit 30 are configured and arranged such that the cycle computer 31 has a control unit that preferably includes a microcomputer with a control program that controls the automatic shifting control and the automatic suspension control. The cycle computer 31 can also include other conventional components such as an input interface circuit, an output interface circuit, and storage devices such as a ROM (Read Only Memory) device and a RAM (Random Access Memory) device. The microcomputer of the cycle computer 31 is programmed to display various information such as the status of the various components as well as programmed to control automatic shifting control and the automatic suspension control. The memory circuit stores processing results and control programs that are run by the processor circuit.

The front shifting unit 32 includes a plurality of shifting push buttons for manually shifting the front derailleur 25 when the cycle computer 31 has been set by the rider to a manual mode. In the illustrated embodiment, as seen in FIG. 2, the front shifting unit 32 is electrically coupled to the bicycle head cap unit 30 by the electrical cord portion 34*b* of the electrical cord 34. In the preferred embodiment, the front shifting unit 32 inputs electrical commands to the bicycle head cap unit 30 which in turn outputs electrical commands to the cycle computer 31. Alternatively, the front shifting unit 32 is electrically coupled directly to the cycle computer 31.

The rear shifting unit 33 includes a plurality of shifting push buttons for manually shifting the rear derailleur 29 when the cycle computer 31 has been programmed or set by the rider to a manual mode. In the illustrated embodiment, the rear shifting unit 33 is electrically coupled to the bicycle head cap unit 30 by the electrical cord portion 34*c* of the electrical cord 34. In the preferred embodiment, the rear shifting unit 33 inputs electrical commands to the bicycle head cap unit 30 which in turn outputs electrical commands to the cycle computer 31. Alternatively, the rear shifting unit 33 is electrically coupled directly to the cycle computer 31.

As seen in FIG. 3, the front suspension fork 18 basically includes a pair of telescoping struts 41 and 42 that are interconnected by an upper crown 43 which is coupled to a steerer tube 46. The steerer tube 46 is coupled to the main bicycle frame 12 in a conventional manner by top and bottom bearing sets 47 and 48 that rotatably support the steerer tube 46 within the head tube 12*d* of the main frame 12. The steerer tube 46 has the handlebar 17 coupled to its upper end in a conventional manner.

As explained below, the basic constructions of the struts 41 and 42 are identical, except that the strut 41 is configured and arranged to act as a shock absorber and the strut 42 is configured and arranged to act as a protective conduit for protecting a cord portion 35*a* of the electrical cord 35 that is electrically coupled to the front dynamo hub 19.

As seen in FIG. 3, the strut 41 includes an inner (upper) telescoping member or tube 41*a* and an outer (lower) telescoping member or tube 41*b* telescopically coupled to the inner telescoping tube 41*a*. The inner and outer telescoping tubes 41*a* and 41*b* are constructed of hard rigid materials that are conventionally used for struts. The inner and outer telescoping tubes 41*a* and 41*b* of the strut 41 are configured and arranged to form a variable volume chamber having a dampening unit located therein. The dampening unit is configured and arranged to absorb impacts on the front suspension fork 12 due to engagement with a rock, a hole, a bump or a like. The dampening unit is preferably an electronically controlled unit that can be automatically adjusted as well as manually adjusted. The dampening unit preferably includes as one or more compression springs in combination with the electric device 18*a* that changes the dampening characteristics of the front suspension fork 18. Automatic dampening unit are known in the art. Accordingly, the dampening unit used in the present invention will not be discussed or illustrated in detail herein.

Preferably, the strut 42 does not include a dampening unit, but rather has the electrical cord portion 35*a* of the electrical cord 35 running therethrough. Of course, if needed and/or desired, a second dampening unit can be installed in the strut 42 that does not interfere with the electrical cord portion 35*a*. The strut 42 basically includes an inner (upper) telescoping member or tube 42*a* and an outer (lower) telescoping member or tube 42*b* telescopically coupled to the inner telescoping tube 42*a*. The inner and outer telescoping tubes 42*a* and 42*b* are constructed of hard rigid materials that are conventionally used for struts. The inner and outer telescoping tubes 42*a* and 42*b* of the strut 42 are configured and arranged to form a variable volume chamber having a majority of the electrical cord portion 35*a* located therein.

Figure 4:
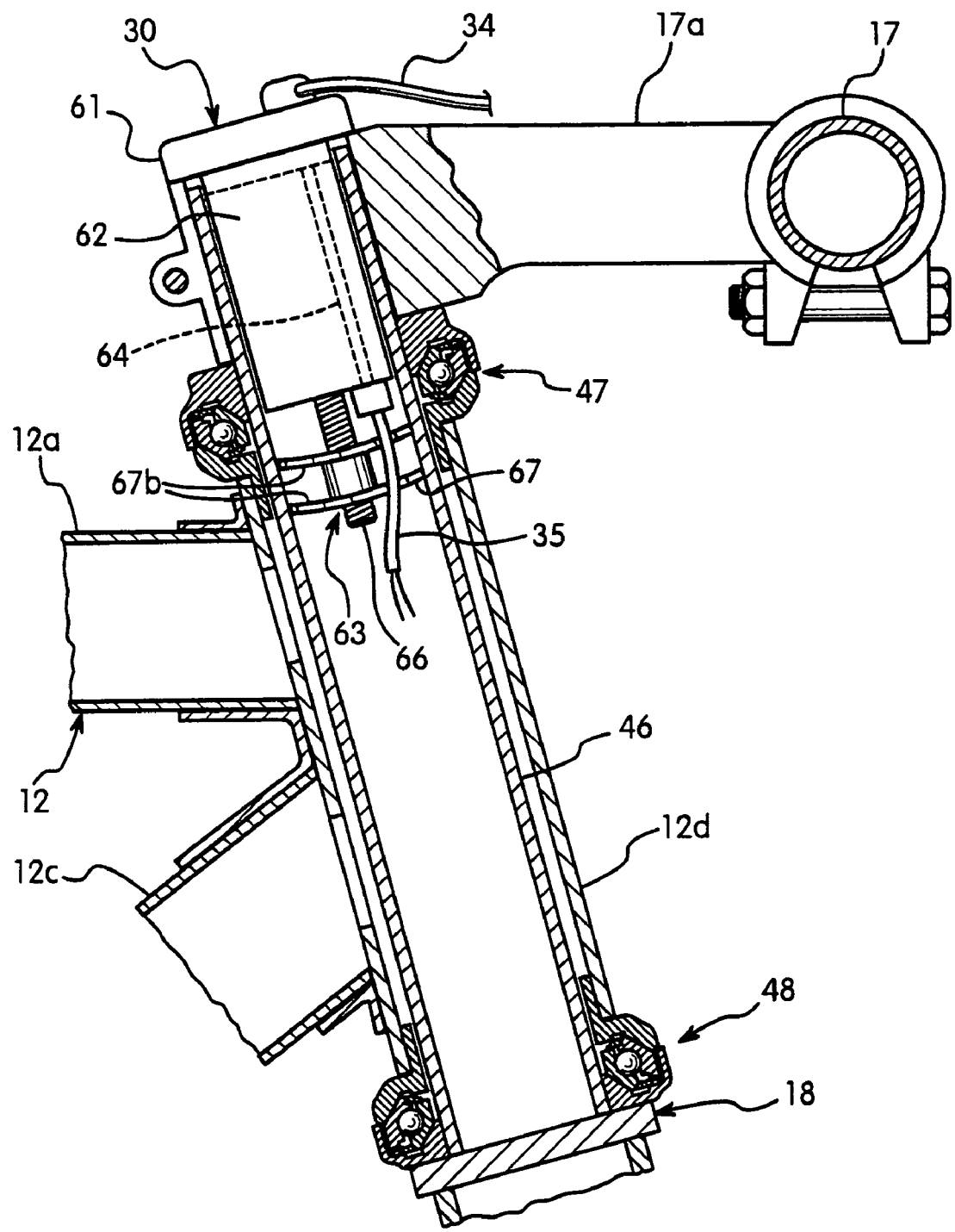
FIG. 4 is a partial enlarged side cross-sectional view of a top portion of the front suspension fork with the bicycle head cap unit mounted therein in accordance with the first embodiment of the present invention.
Figure 5:
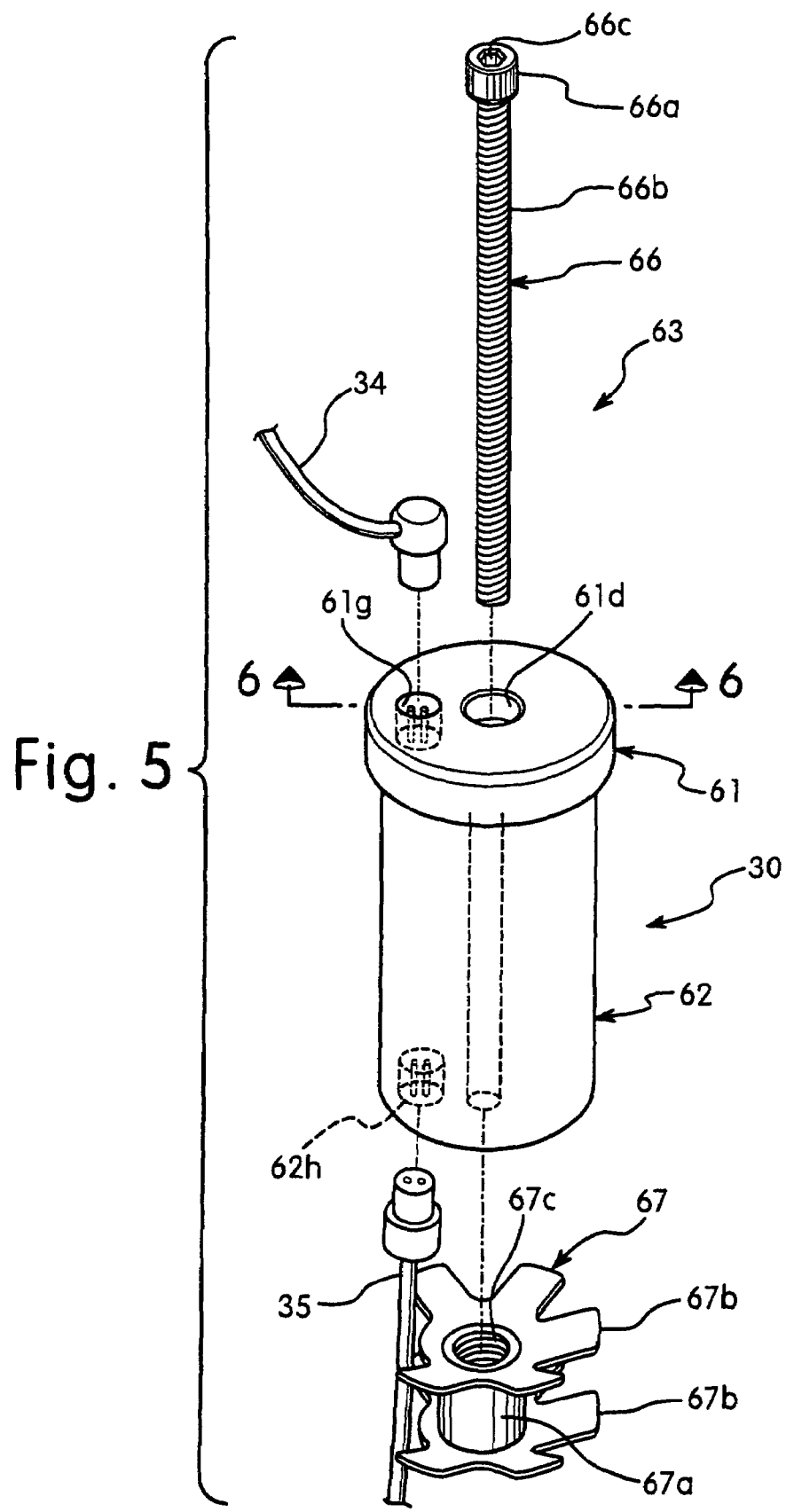
FIG. 5 is an exploded perspective view of the bicycle head cap unit in accordance with the first embodiment of the present invention.

Turning now to FIGS. 3–5, the bicycle head cap unit 30 is coupled to the steerer tube 46 of the front suspension fork 18 in accordance with the first embodiment of the present invention. The head cap unit 30 basically includes a cap portion 61, a housing portion 62, a fixing portion 63 and an electrical part 64. In this embodiment, the cap portion 61 and the housing portion 62 are constructed as two separate individual members that are rigidly and fixedly coupled together to form a single unit with an electrical part receiving space formed therebetween for accommodating the electrical part 64 therein.

The fixing portion 63 secures the cap portion 61 and the housing portion 62 to the steerer tube 46 of the front suspension fork 18. The head cap unit 30 is inserted into the top opening of the steerer tube 46 such that the cap portion 61 is partially located outside of the steerer tube 46 and the housing portion 62 is located fully within the steerer tube 46 with the fixing portion 63 engaging the inside surface of the steerer tube 46 to fasten the head cap unit 30 thereto. Preferably, the head cap unit 30 is arranged such that the cap portion 61 contacts the mounting portion 17*a* of the handlebar 17 to apply a downward force on the mounting portion 17*a* of the handlebar 17. This downward force on the mounting portion 17*a* of the handlebar 17 applies a downward force on the top bearing set 47 that rotatably supports the steerer tube 46 within the head tube 12*d* of the main frame 12.

Figure 6:
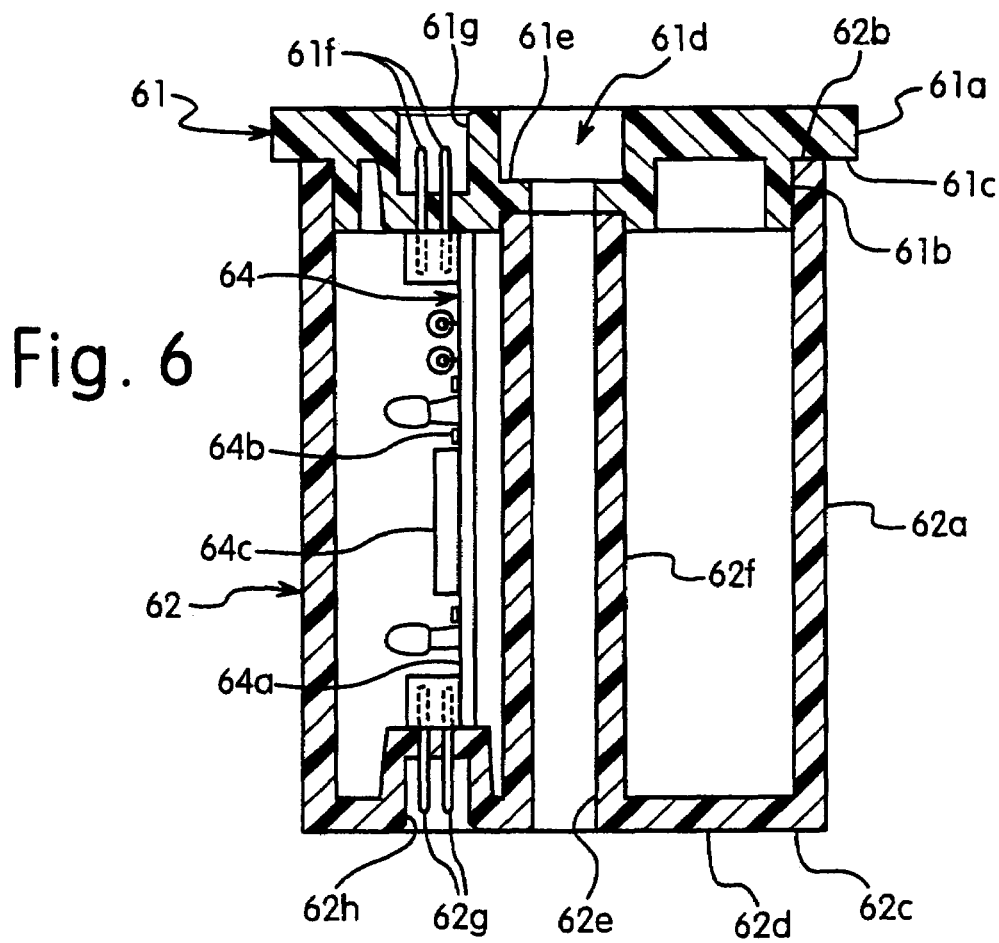
FIG. 6 is a longitudinal cross-sectional view of the bicycle head cap unit in accordance with the first embodiment of the present invention as seen along section line 6—6 of FIG. 5 in accordance with the first embodiment of the present invention.

As best seen in FIG. 6, the cap portion 61 is preferably constructed as a one-piece, unitary member from a hard rigid material. Preferably, the cap portion 61 is formed of a nonconductive material such as a hard rigid plastic material. Basically, the cap portion 61 has a step-shaped configuration that defines a first or upper section 61*a* and a second or lower section 61*b* with an annular abutment surface 61*c* formed therebetween. Also, a central bolt opening or bore 61*d* extends axially through the center of the first and second sections 61*a* and 61*b* for receiving a part of the fixing portion 63 as explained below. Preferably, the bolt opening or bore 61*d* also has a step-shaped configuration that forms an abutment 61*e* that faces in an opposite axial direction to abutment 61*c*. Preferably, the outer peripheral surface of the first section 61*a* of the cap portion 61 is cylindrical. Likewise, the outer peripheral surface of the second section 61*b* of the cap portion 61 is also preferably cylindrical and concentric with the cylindrical outer surface of the first section 61a of the cap portion 61.

Preferably, the cap portion 61 has a plurality of electrical conductors 61f (only two shown for the sake of simplicity and illustration) embedded within the cap portion 61. A cord receiving recess 61g is formed within the first section 61a of the cap portion 61 around the electrical conductors 61f such that portions of the electrical connectors 61f are exposed within the cord receiving recess 61g. The cord receiving recess 61g and the electrical conductors 61f form a first electrical connection of the head cap unit 30. Also, the opposite or inner ends of the electrical conductors 61f are exposed within the head cap unit 30 since they extend outwardly from the second section 61b into the housing portion 62. The inner ends of the electrical conductors 61f are electrically connected to the electrical part 64 that is retained in the housing portion 62.

The housing portion 62 is preferably constructed as a one-piece, unitary member from a hard rigid material. More preferably, the housing portion 62 is constructed of a non-conductive material such as a hard rigid plastic material. The housing portion 62 is fixedly coupled to the cap portion 61 using conventional fastening techniques such as an adhesive. Of course, it will be apparent to those skilled in the art from this disclosure that the housing portion 62 can be fixedly coupled to the cap portion 61 using other fastening methods such as a screw connection, a bayonet connection or the like. The housing portion 62 together with the cap portion 61 forms the electrical part receiving space that contains the electrical part 64.

The housing portion 62 preferably has an outer diameter that is equal to or smaller than the inner diameter of the steerer tube 46 such that the housing portion 62 easily fits within the interior of the steerer tube 46. The diameter of the first section 61a of the cap portion 61 is preferably sized to be substantially equal to the outer diameter of the mounting portion 17a of the handlebar 17 to prevent the cap portion 61 from being inserted in to the interior of the steerer tube 46.

The housing portion 62 basically includes a tubular side wall 62a having a first open end 62b and a substantially closed end 62c. Preferably, the tubular side wall 62a has a substantially cylindrical inner surface and a substantially cylindrical outer surface. The first open end 62b of the housing portion 62 preferably has an inner diameter that is equal to or slightly larger than the second section 61b of the cap portion 61 such that the housing portion 62 easily fits within the interior of the steerer tube 46 such that the housing portion 62 can be adhesively coupled to the cap portion 61. Of course, it will be apparent to those skilled in the art from this disclosure that other types of connections can be formed between the cap portion 61 and the housing portion 62 to fixedly couple the two portions together.

The closed end 62c of the housing portion 62 is preferably provided with an end wall 62d that has a centrally located bolt opening or bore 62e that receives a portion of the fixing portion 63 as explained below. In this embodiment, preferably, a tubular part 62f extends axially within the electrical part receiving space of the housing portion 62. The tubular part 62f is arranged such that it interconnects the bolt bore 61d of the cap portion 61 with the bolt bore 62e of the housing portion 62. Preferably, the free end of the tubular part 62f contacts the second section 61b of the cap portion 61 and is adhesively joined thereto in order to isolate the interior of the tubular part 62f from the electrical part receiving space formed between the cap portion 61 and the housing portion 62. In an alternative embodiment, the housing portion 62 is modified to eliminate the tubular part 62f and the fixing portion is provided with sealing members or O-rings.

Preferably, the end wall 62d of the housing portion 62 has a plurality of electrical conductors 62g (only two shown for the sake of simplicity and illustration) embedded within the housing portion 62. A cord receiving recess 62h is formed within the end wall 62d of the housing portion 62 around the electrical conductors 62g such that portions of the electrical connectors 62g are exposed within the cord receiving recess 62h. The cord receiving recess 62h and the electrical conductors 62g form a second electrical connection of the head cap unit 30. Also, the opposite or inner ends of the electrical conductors 62g are exposed within the head cap unit 30 since they extend outwardly from the end wall 62d into the electrical part receiving space of the housing portion 62. The inner ends of the electrical conductors 62g are electrically connected to the electrical part 64 that is retained in the housing portion 62.

As seen in FIG. 5, the fixing portion 63 preferably includes a fixing bolt 66 and a fixing nut 67 for securing the head cap unit 30 within the steerer tube 46. The fixing bolt 66 is preferably constructed of a hard rigid material such as a metallic material. The fixing bolt 66 has a head portion 66a and a threaded shaft portion 66b extending axially from the head portion 66a. Preferably the head portion 66a has a tool receiving recess 66c for receiving a tool to rotate the fixing bolt 66. The tool receiving recess 66c is preferably a noncircular recess such as a hexagon or other non-circular recess.

The fixing nut 67 is preferably a so-called star nut that has a threaded sleeve 67a with a pair of axially spaced retaining washers 67b fixedly coupled to opposite ends of the threaded sleeve 67a. The threaded sleeve 67a has internal threads 67c that correspond to the external threads of the threaded shaft 66b such that the fixing nut 67 is threaded onto the threaded shaft 66b of the fixing bolt 66. The retaining washers 67b are preferably concave washers with a limited degree of resiliency or flexibility such that the retaining washers 67b can be inserted into the steerer tube 46 with a relatively small amount of force and can not be easily removed. Thus, the outer widths or diameters of the retaining washers 67b are sized to be slightly larger than the inner diameter of the steerer tube 46. In other words, to install the fixing nut 67 into the steerer tube 46, the fixing nut 67 is press fitted into the into the steerer tube 46 to slightly bend the retaining washers 67b in a radial and axial direction. Preferably, the retaining washers 67b are formed of five projecting tab elements to form a generally star shaped configuration. Also, preferably, two of the tab elements of each of the retaining washers 67b are separated farther apart than the others to form a cord receiving space such that the electrical cord 35 can pass between the fixing nut 67 and the inner surface of the steerer tube 46.

Figure 7:
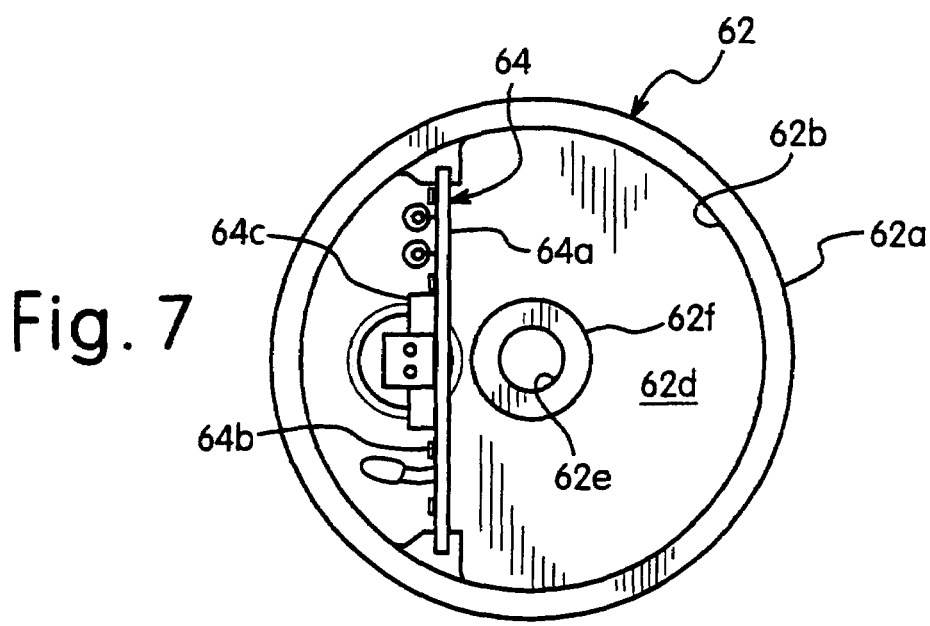
FIG. 7 is a top plan view of the housing portion of the bicycle head cap unit in accordance with the first embodiment of the present invention.

As seen in FIGS. 6 and 7, the electrical part 64 is diagrammatically illustrated and preferably includes a printed circuit board 64a with an electrical circuit 64b printed thereon. The electrical circuit board 64a also preferably includes a battery or capacitor 64c for storing electrical energy. The size of the electrical battery or capacitor 64c will depend upon the electrical devices that are being operated by the head cap unit 30. Preferably, the printed circuit board 64a with the printed circuit 64b forms a control unit for controlling the electrical suspensions 24 and 26 as well as the front and rear derailleurs 25 and 29. Thus, the printed circuit board 64a preferably includes a microcomputer with a control program that controls the automatic shifting control and the automatic suspension control. The printed circuit board 64a can also include other conventional components such as an input interface circuit, an output interface circuit, and storage devices such as a ROM (Read Only Memory) device and a RAM (Random Access Memory) device. The memory circuit stores processing results and control programs that are run by the processor circuit.

Second Embodiment

Figure 8:
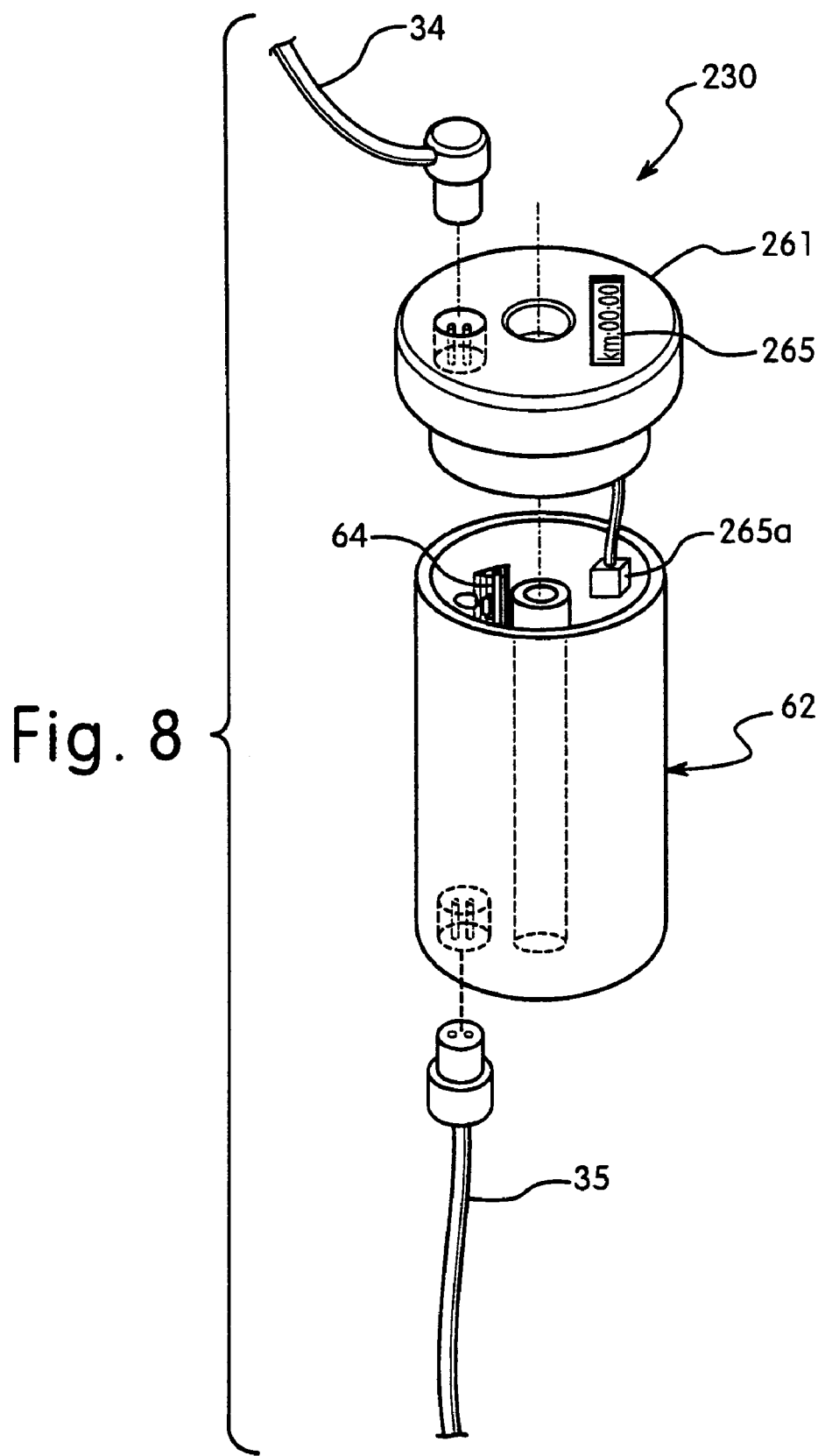
FIG. 8 is an exploded perspective view of a bicycle head cap unit in accordance with a second embodiment of the present invention.

Referring now to FIG. 8, a head cap unit 230 in accordance with a second embodiment will now be explained. Basically, the head cap unit 230 of this second embodiment is identical the head cap unit 30 of the first embodiment, except that an indicator display 265 has been added. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In this second embodiment, the head cap unit 230 is coupled to the steerer tube 46 of the front suspension fork 18 in the same manner as the first embodiment of the present invention. Thus, the head cap unit 230 basically includes a modified cap portion 261 that is used with the housing portion 62, the fixing portion 63 and the electrical part 64 of the first embodiment. Thus, the electrical part 64 of the head cap unit 230 is electrically coupled to the electrical cords 34 and 35.

The modified cap portion 261 is identical in construction to the cap portion 61, as discussed above, except for addition of the indicator display 265. The indicator display 265 is embedded in the cap portion 261 and arranged such that the rider can easily view the indicator when riding the bicycle 10. The indicator display 265 is a relatively conventional component, and thus will not be discussed or illustrated in detail herein. The indicator display 265 can be merely an LCD display or can include other parts of a cycle computer as needed and/or desired. The indicator display 265 is electrically coupled to the electrical part 64 via an electrical wire 265a that plugs into a mating electrical connector formed on the electrical circuit board 64a of the electrical part 64.

In the second embodiment, the indicator display 265 is preferably configured and arranged to at least display the speed or velocity of the bicycle 10. Of course, the indicator display 265 is alternatively riding conditions of the bicycle 10. The speed or velocity of the bicycle 10 is preferably calculated based on the dynamo pulses that are produced by the front dynamo hub 19 in a conventional manner. Basically, the front dynamo hub 19 includes several pawls that generate alternating current (AC). In other words, the front dynamo hub 19 generates plus and minus pulses that are transmitted to the electrical part 64 via the electrical cord 35a which in turn outputs the speed or velocity of the vehicle 10 from the electrical part 64 to the indicator display 265 via the electrical wire 265a. Accordingly, the plus and minus pulses of the front dynamo hub 19 are preferably utilized to calculate the speed or velocity of the bicycle 10 without the need of utilizing a separate velocity sensing arrangement.

Third Embodiment

Figure 9:
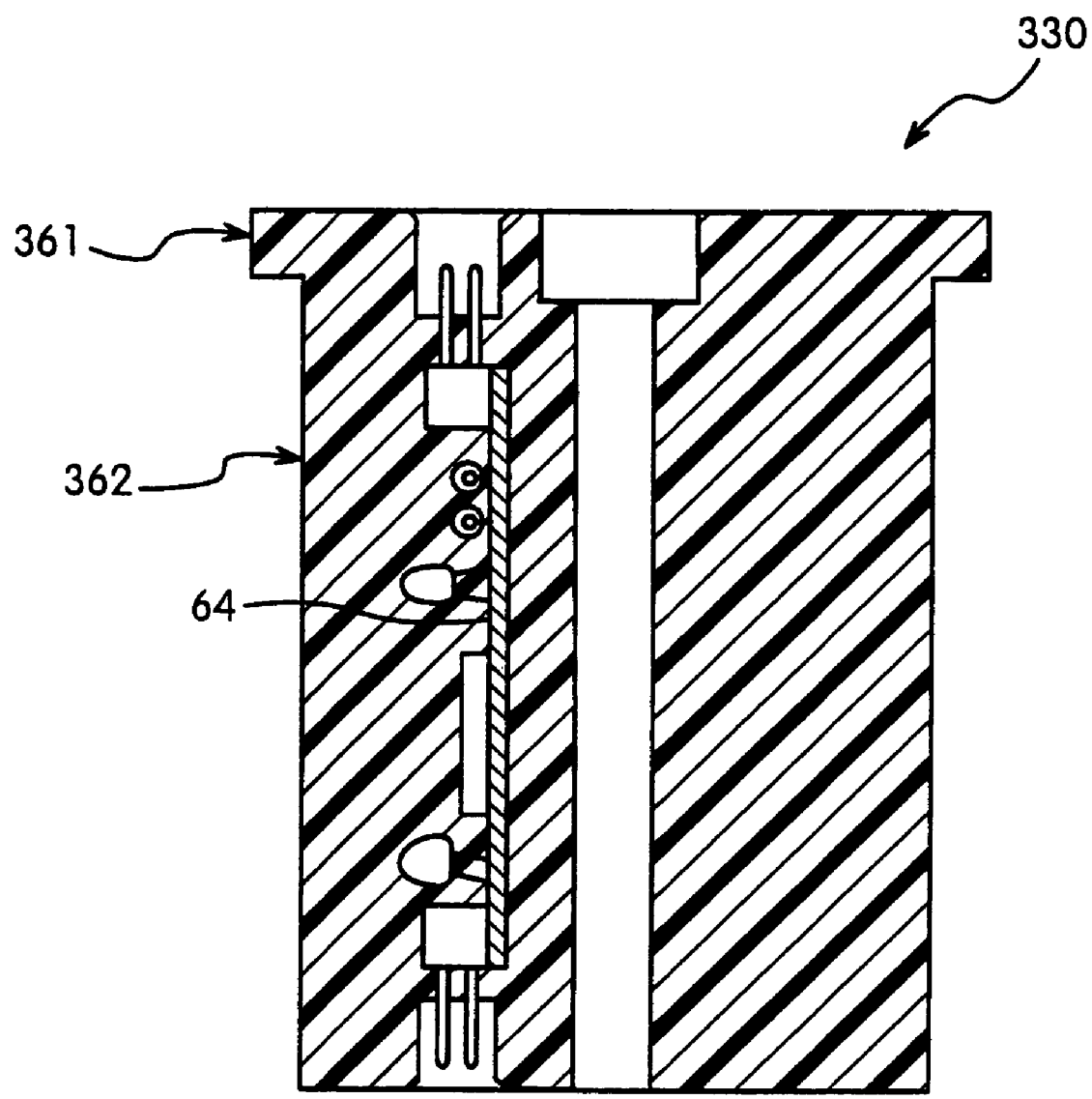
FIG. 9 is a longitudinal cross-sectional view of a bicycle head cap unit in accordance with a third embodiment of the present invention.

Referring now to FIG. 9, a head cap unit 330 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In another alternative embodiment, the head cap unit 330 is provided with a cap portion 361 and a housing portion 362 that are molded together about the electrical part 64. In other words, the cap portion 361 and the housing portion 362 are molded as a one-piece, unitary member about the electrical part 64. Thus, the electrical part receiving space in this embodiment is defined by the electrical part 64. Stated differently, the electrical part receiving space is completely filled by the electrical part 64 when the cap portion 361 and the housing portion 362 are formed as a one-piece, unitary member that is molded onto the electrical part 64. Of course, it will be apparent to those skilled in the art from this disclosure that the electrical part receiving space in the molded embodiment does not have to be completely filled by the electrical part 64. Rather, various spaces can be provided for weight reduction or as needed and/or desired.

In this third embodiment, the head cap unit 330 is coupled to the steerer tube 46 of the front suspension fork 18 in the same manner as the first embodiment of the present invention. Thus, the head cap unit 330 uses the fixing portion 63 of the first embodiment. Moreover, the electrical part 64 of the head cap unit 330 is electrically coupled to the electrical cords 34 and 35.

Fourth Embodiment

Figure 10:
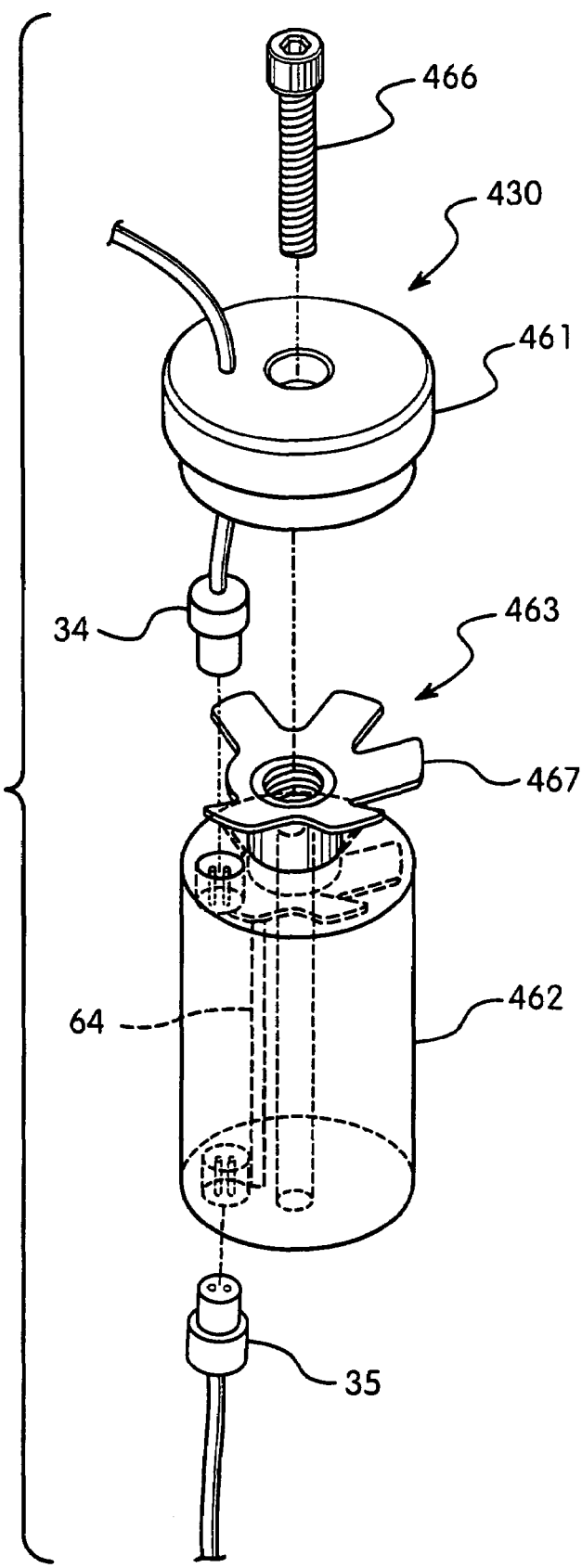
FIG. 10 is an exploded perspective view of a bicycle head cap unit in accordance with a fourth embodiment of the present invention.

Referring now to FIG. 10, a head cap unit 430 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In this fourth embodiment, the head cap unit 430 is coupled to the steerer tube 46 of the front suspension fork 18 in basically the same manner as in the first embodiment of the present invention. The head cap unit 430 basically includes a modified cap portion 461 that is coupled to a modified housing portion 462 by a modified fixing portion 463. The electrical part 64 of the first embodiment is molded with the housing portion 462, similar to the third embodiment. Thus, the electrical part 64 of the head cap unit 430 is electrically coupled to the various electrical components of the bicycle 10 via the electrical cords 34 and 35.

In this fourth embodiment, the modified fixing portion 463 includes a modified fixing bolt 466 and a fixing nut 467 that is identical to the fixing nut 67 of the prior embodiments, except for the portion of the fixing nut 467 that is embedded in the housing portion 462 is smaller in width than in the prior embodiments. The fixing nut 467, in this fourth embodiment, is disposed between the cap portion 461 and the housing portion 462. Preferably, the fixing nut 467 is embedded in the housing portion 462. More specifically, the housing portion 462 is molded as a one-piece, unitary member about the electrical part 64 and the lower one of the retaining washers.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle head cap unit comprising:
   a cap portion having an upper surface, a lower abutment surface and an annular side surface, the cap portion being dimensioned to close a top opening of a steerer tube of a bicycle fork with the lower abutment surface facing axially towards a free edge of the steerer tube; and
   a housing portion extending axially from the lower abutment surface of the cap portion, the housing portion being configured and dimensioned to form an electrical part receiving space and a bolt bore, the electrical part receiving space being outside the bolt bore, the housing portion being further configured and dimensioned with an outer maximum width that is smaller than an annular steerer tube space being projected from a peripheral edge of the lower abutment surface of the cap portion and surrounding the housing portion, the electrical part receiving space being located within the steerer tube when the cap portion closes the top opening of the steerer tube of the bicycle fork.

2. The bicycle head cap unit according to claim 1, further comprising
   a fixing portion coupled to at least one of the cap portion and the housing portion, the fixing portion being configured to secure the cap portion within a steerer tube of a bicycle fork.

3. The bicycle head cap unit according to claim 2, wherein the fixing portion includes a fixing bolt and a fixing nut threadedly coupled thereto.

4. The bicycle head cap unit according to claim 3, wherein the fixing nut is disposed adjacent an end of the housing portion that is opposite the cap portion.

5. The bicycle head cap unit according to claim 3, wherein the fixing nut is disposed between the housing portion and the cap portion.

6. The bicycle head cap unit according to claim 3, wherein
   at least one of the cap portion and the housing portion includes a tubular part extending through the electrical part receiving space to isolate the fixing bolt disposed in the tubular part from the electrical part receiving space.

7. The bicycle head cap unit according to claim 1, wherein the electrical part receiving space has a bicycle control unit disposed therein.

8. The bicycle head cap unit according to claim 1, wherein the electrical part receiving space has a bicycle battery disposed therein.

9. The bicycle head cap unit according to claim 1, wherein
   at least one of the cap portion and the housing portion includes an electrical connector arranged to form an electrical connection within the electrical part receiving space.

10. A bicycle head cap unit according to claim 1, wherein
    the electrical part receiving space has an electrical part disposed therein.

11. The bicycle head cap unit according to claim 10, wherein
    the electrical part is electrically coupled to an electrical device of a bicycle suspension.

12. The bicycle head cap unit according to claim 11, wherein
    the cap portion includes a first electrical connector electrically coupled to the electrical part and the housing portion includes a second electrical connector electrically coupled to the electrical part.

13. The bicycle head cap unit according to claim 10, wherein
    the housing portion is molded around the electrical part such that the electrical part receiving space is at least partially defined by the electrical part.

14. The bicycle head cap unit according to claim 10, wherein
    the housing portion has an open end with the cap portion fixed to the open end of the housing portion to define the electrical part receiving space.

15. The bicycle head cap unit according to claim 10, further comprising
    a fixing portion coupled to at least one of the cap portion and the housing portion, the fixing portion being configured to secure the housing portion within a steerer tube of a bicycle fork.

16. The bicycle head cap unit according to claim 15, wherein the fixing portion includes a fixing bolt and a fixing nut threadedly coupled thereto.

17. The bicycle head cap unit according to claim 16, wherein the fixing nut is disposed adjacent an end of the housing portion that is opposite the cap portion.

18. The bicycle head cap unit according to claim 16, wherein
    the fixing nut is disposed between the housing portion and the cap portion.

19. A bicycle head cap unit comprising:
    a cap portion having an upper surface, a lower abutment surface and an annular side surface, the cap portion being dimensioned to close a top opening of a steerer tube of a bicycle fork with the lower abutment surface facing axially towards a free edge of the steerer tube;
    a housing portion extending axially from the lower abutment surface of the cap portion, the housing portion being configured and dimensioned to form an electrical part receiving space, the housing portion being further configured and dimensioned with an outer maximum width that is smaller than an annular steerer tube space being projected from a peripheral edge of the lower abutment surface of the cap portion and surrounding the housing portion, the electrical part receiving space being located within the steerer tube when the cap portion closes the top opening of the steerer tube of the bicycle fork; and a fixing portion coupled to at least one of the cap portion and the housing portion, the fixing portion being configured to secure the cap portion within a steerer tube of a bicycle fork, the cap portion including a first electrical connector and the housing portion including a second electrical connector.

20. A bicycle head cap unit comprising:

a cap portion having an upper surface, a lower abutment surface and an annular side surface, the cap portion being dimensioned to close a top opening of a steerer tube of a bicycle fork with the lower abutment surface facing axially towards a free edge of the steerer tube; and a housing portion extending axially from the lower abutment surface of the cap portion, the housing portion being configured and dimensioned to form an electrical part receiving space, the housing portion being further configured and dimensioned with an outer maximum width that is smaller than an annular steerer tube space being projected from a peripheral edge of the lower abutment surface of the cap portion and surrounding the housing portion, the electrical part receiving space being located within the steerer tube when the cap portion closes the top opening of the steerer tube of the bicycle fork, the cap portion having a top surface with an indicator display thereon.

21. A bicycle head cap unit a cap portion having an upper surface, a lower abutment surface and an annular side surface, the cap portion being dimensioned to close a ton opening of a steerer tube of a bicycle fork with the lower abutment surface facing axially towards a free edge of the steerer tube;

a housing portion extending axially from the lower abutment surface of the cap portion, the housing portion being configured and dimensioned to form an electrical part receiving space, the electrical part receiving space having an electrical part disposed therein. the housing portion being further configured and dimensioned with an outer maximum width that is smaller than an annular steerer tube space being projected from a peripheral edge of the lower abutment surface of the cap portion and surrounding the housing portion, the electrical part receiving space being located within the steerer tube when the cap portion closes the top opening of the steerer tube of the bicycle fork; and a fixing portion coupled to at least one of the cap portion and the housing portion, the fixing portion being configured to secure the housing portion within a steerer tube of a bicycle fork, the fixing portion including a fixing bolt and a fixing nut threadedly coupled thereto, at least one of the cap portion and the housing portion including a tubular part extending through the electrical part receiving space to isolate the fixing bolt disposed in the tubular part from the electrical part receiving space.

22. A bicycle head cap unit comprising:

a housing portion having a first end and a second end with an electrical part receiving space located between the first and second ends;

a fixing bolt extending longitudinally through a bolt bore of the housing portion between the first and second ends; and a fixing nut configured to threadedly engage a free end of the fixing bolt to secure the housing portion within a bicycle tube, the electrical part receiving space being outside the bolt bore.

23. The bicycle head cap unit according to claim 22, further comprising a cap portion extending axially from one of the first and second ends of the housing portion.

24. A bicycle head cap unit according to claim 22, further comprising an electrical component disposed within the electrical part receiving space.

* * * * *